United States Patent [19]

Lundahl

[11] Patent Number: 4,738,087
[45] Date of Patent: Apr. 19, 1988

[54] HARVESTER FOR STRIPPING SEED FROM A STANDING CROP

[75] Inventor: E. Cordell Lundahl, Logan, Utah

[73] Assignee: Deere & Company, Moline, Ill.

[21] Appl. No.: 371,741

[22] Filed: Apr. 26, 1982

[51] Int. Cl.$^4$ .............................................. D01H 7/04
[52] U.S. Cl. ........................................ 56/130; 56/126; 56/128
[58] Field of Search ............... 56/12.8, 12.9, 13.1, 56/13.2, 126, 128, 129, 130, DIG. 1, DIG. 8, DIG. 12

[56] References Cited

U.S. PATENT DOCUMENTS

| | | | |
|---|---|---|---|
| 2,065,721 | 12/1936 | Mutzbauer | 56/13.2 |
| 2,460,029 | 1/1949 | Ramp | 56/19 |
| 2,485,713 | 10/1949 | Dowd | 56/23 |
| 2,673,438 | 3/1954 | Miller et al. | 56/33 |
| 2,674,080 | 4/1954 | Wilson | 56/33 |
| 2,706,373 | 4/1955 | Nisbet | 56/128 |
| 2,853,845 | 9/1956 | Smith | 56/128 |
| 3,184,905 | 5/1965 | Hillier | 56/130 |
| 3,555,790 | 1/1971 | Quick | 56/12.8 |
| 3,581,483 | 6/1971 | Kohl et al. | 56/DIG. 8 |
| 3,828,531 | 8/1974 | Quick | 56/12.9 |

FOREIGN PATENT DOCUMENTS 217670 1/1958 Australia ............... 56/126
1240440 12/1960 France .

*Primary Examiner*—Robert P. Swiatek
*Assistant Examiner*—Adriene J. Lepiane

[57] ABSTRACT

A harvester includes a mobile vehicle with a forward vertically adjustable header that includes a mechanism for stripping grain from a standing crop as the machine advances while leaving the stem of the crop attached to the soil. The stripping mechanism including a pair of axially transverse vertically offset brush-type rotors having randomly spaced radial bristles, the upper rotor being disposed slightly forwardly of the lower and being driven so that its lower surface moves rearwardly in close proximity to the rearwardly moving upper surface of the lower roller that is driven in the opposite direction from the first rotor. The grain heads on most of the standing crop is disposed between the axes of the rotors, and the grain is stripped as the heads move into the bite between the rotors. A front blower directs a stream of air toward the bite and a rear blower directs a stream of air upwardly to the rear of the lower rotor, to create a lower pressure zone behind the rotors that assist the feeding of stripping material to a collector bin on the vehicle.

6 Claims, 2 Drawing Sheets

HARVESTER FOR STRIPPING SEED FROM A STANDING CROP

BACKGROUND OF THE INVENTION

The present invention relates to the harvesting of seeds from soil crops and especially to the stripping of seeds from a standing crop while leaving the stems of the crop attached to the ground.

Some soil crops, such as wheat for example, have traditionally been harvested by combines which cut and collect the standing stalks with the head of grain attached, and thereafter separate the grain seeds from the chaff. Although effective, such combines are quite large and costly, due in large part to the high power requirements and the need for providing a separating mechanism capable of separating and handling the large amounts of chaff which are collected.

Other soil crops, such as grass seed for example, have been harvested by machines which employ one or more rotary brushes or other tined rollers which are intended to beat or pull the seeds from the stems. The removed seeds are impelled to a collecting zone, possibly with the aid of an air suction or blowing mechanism. Exemplary of such structures are the disclosures in U.S. Pat. Nos. 1,134,443 issued to Engle on Apr. 6, 1915; 1,206,409 issued to Bruce on Nov. 28, 1916; and 2,460,029 issued to Ramp on Jan. 25, 1949.

Harvesters of that kind may include a pair of axially transverse brush-type rotors which form a bite therebetween within which the crop heads are to be acted upon as the harvester traverses a field. In this regard, the brush bristles rub against the seeds within the bite and strip the seeds from the crop heads. Upon being stripped, the seeds are conveyed to a collecting zone. Among the problems which would expectedly be encountered by such a harvester is the need to establish an optimum cooperative or interacting relationship between the crop heads and the rotors as regards crop head orientation and rotor speed, for example, to maximize the effectiveness of seed removal. It is also necessary to provide a seed conveyance technique which minimizes the loss of stripped seeds. It has been proposed to employ one or more air streams for conveying the seeds to the collecting zone and/or for bending the standing crop into the bite. While such expedients seem promising, commercial success has yet to be achieved.

Numerous other grain harvesters have been proposed which involve a rotary beater intended to strike the grain heads in some fashion to separate the grain from the stalk. Exemplary of such machines are the disclosures in the following U.S. Pat. Nos. 1,146,785 issued to Colahan on July 20, 1915; 2,485,713 issued to Dowd on Oct. 25, 1949; 2,499,047 issued to Wilkins on Feb. 28, 1950; 2,693,072 issued to Belzer et al on Nov. 2, 1954; 2,706,373 issued to Nisbet on Apr. 19, 1955; 2,853,845 issued to Smith on Sept. 30, 1958; 3,184,905 issued to Hillier on May 25, 1965; and French Pat. No. 1,240,440 issued Nov. 17, 1959. However, none of those proposals has achieved commercial success.

SUMMARY OF THE INVENTION

It is, therefore, an object of the present invention to provide a novel seed harvester which maximizes the removal of crop seeds and minimizes the intake of chaff.

Another object of the invention is to provide such a harvester which conveys the removed seeds to a collecting zone with minimal losses.

It is a further object of the invention to provide such a harvester in which crop heads are directed into a bite between two rotors whereupon the seeds are removed by a rubbing and percussion action while the crop stems remain attached to the ground.

It is yet another object of the invention to provide such a harvester which reduces the power requirements typical of traditional combines.

These objects are achieved by the present invention which relates to a harvesting machine for stripping seeds from a standing crop while essentially leaving the stems of the crop attached to the soil. The machine comprises a mobile frame adapted to advance over a field of the standing crop, and a harvesting header carried by the main frame. A first axially transverse stripping rotor is mounted for rotation on the header and has a generally cylindrical outer periphery. The lower side of the stripping rotor is disposed below the level of the seeds on the standing crop. A second axially transverse stripping rotor has a generally cylindrical outer periphery and is mounted on the header forwardly and above the first stripping rotor in close proximity thereto. The axis of the second rotor is generally above the level of the seeds on the standing crop. A motor is provided for rotating the rotors in opposite directions at approximately a common peripheral speed in the range of 18-27 m/sec, the front side of the first rotor moving upwardly and the front side of the second rotor moving downwardly so that the seeds engaged by the rotors move rearwardly through the bite between the rotors and are stripped and threshed from the standing stems. A crop collector is disposed on the header behind the rotors for receiving material passing through the bite between the rotors and has an outlet. A blower is mounted on the header and has an outlet communicating with the housing adjacent to the first rotor for directing a stream of air along the rear side of the first rotor and through the outlet, the air stream inducing a rearward flow of air and creating a low pressure zone behind the rotors that aids the rearward flow of crop material.

Preferably, a second blower is mounted on the header and has a rearwardly directed outlet forwardly of the second rotor and above the level of the standing crop for directing a rearward stream of air toward the bite between the rotors.

The rotors preferably comprise brushes having radial bristles with their outer ends forming the periphery of the rotor. The outer ends of the bristles are randomly and closely located on the brush periphery so that the rotating brush presents a substantially solid face to the seeds, the seeds being stripped from the stems by the outer ends of the bristles.

BRIEF DESCRIPTION OF THE DRAWINGS

These objects and advantages of the invention will become apparent from the following detailed description of a preferred embodiment thereof in connection with the accompanying drawings in which like numerals designate like elements, and in which.

DESCRIPTION OF THE PREFERRED EMBODIMENT

Figure 1:
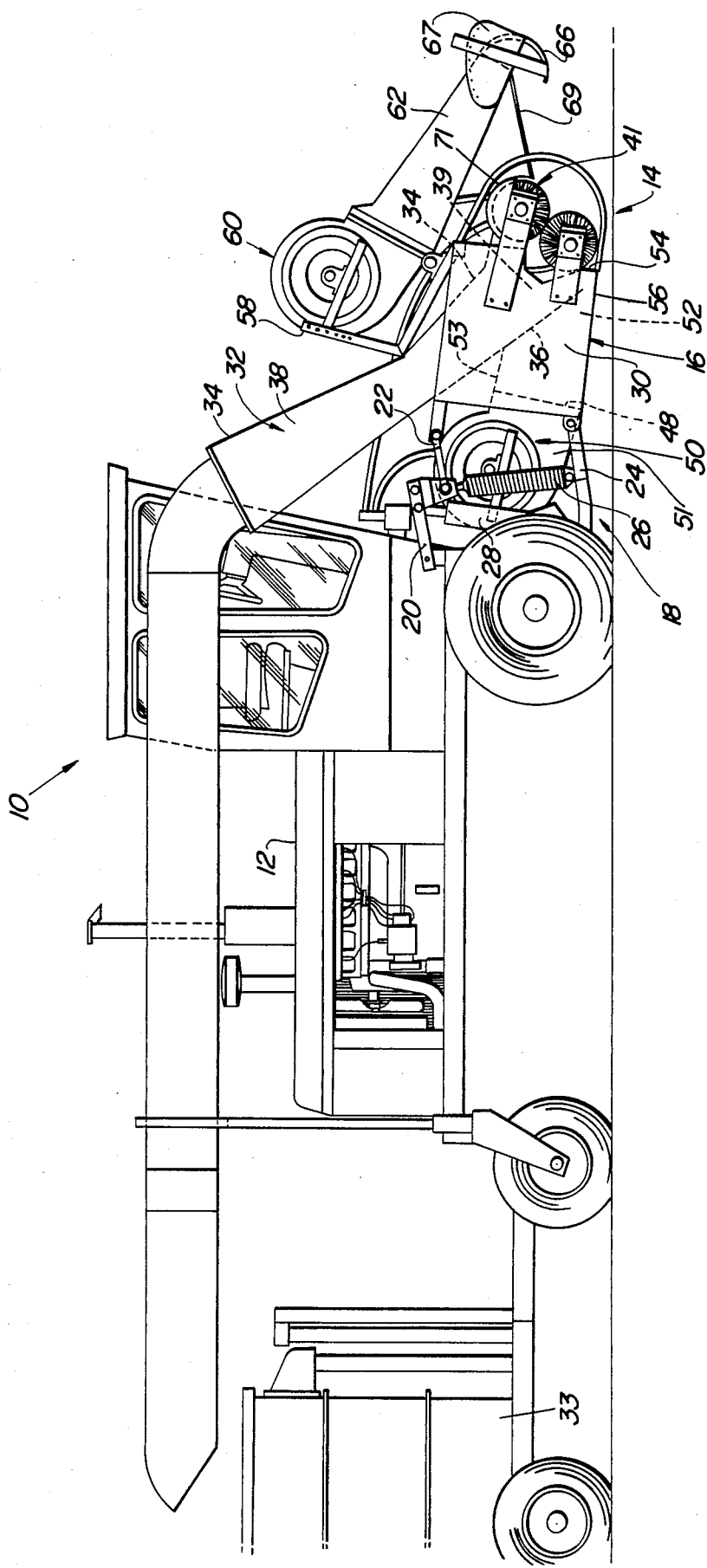
FIG. 1 is a side elevational view of a harvester according to the present invention.
Figure 2:
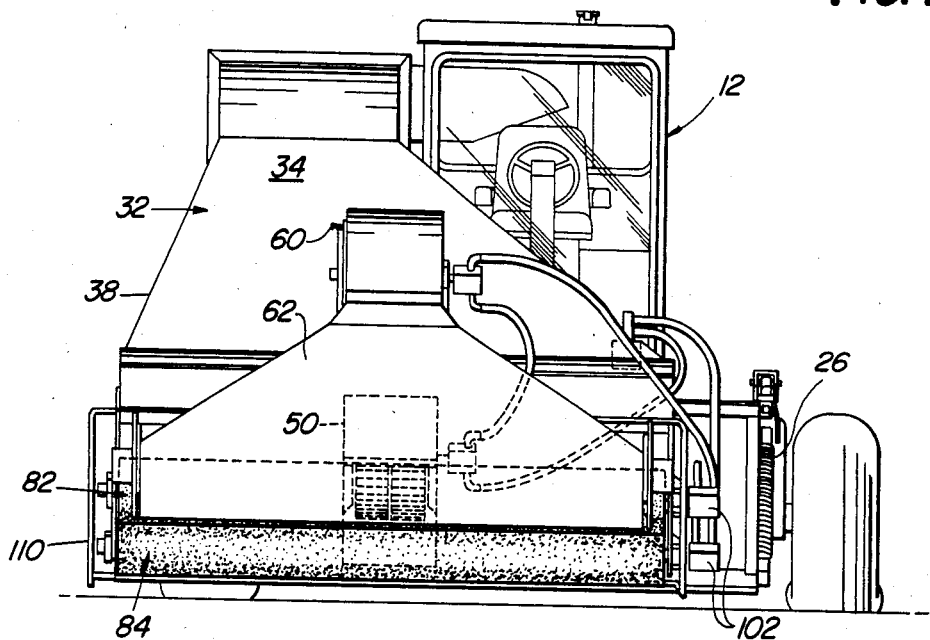
FIG. 2 is a front view of the harvester.
Figure 3:
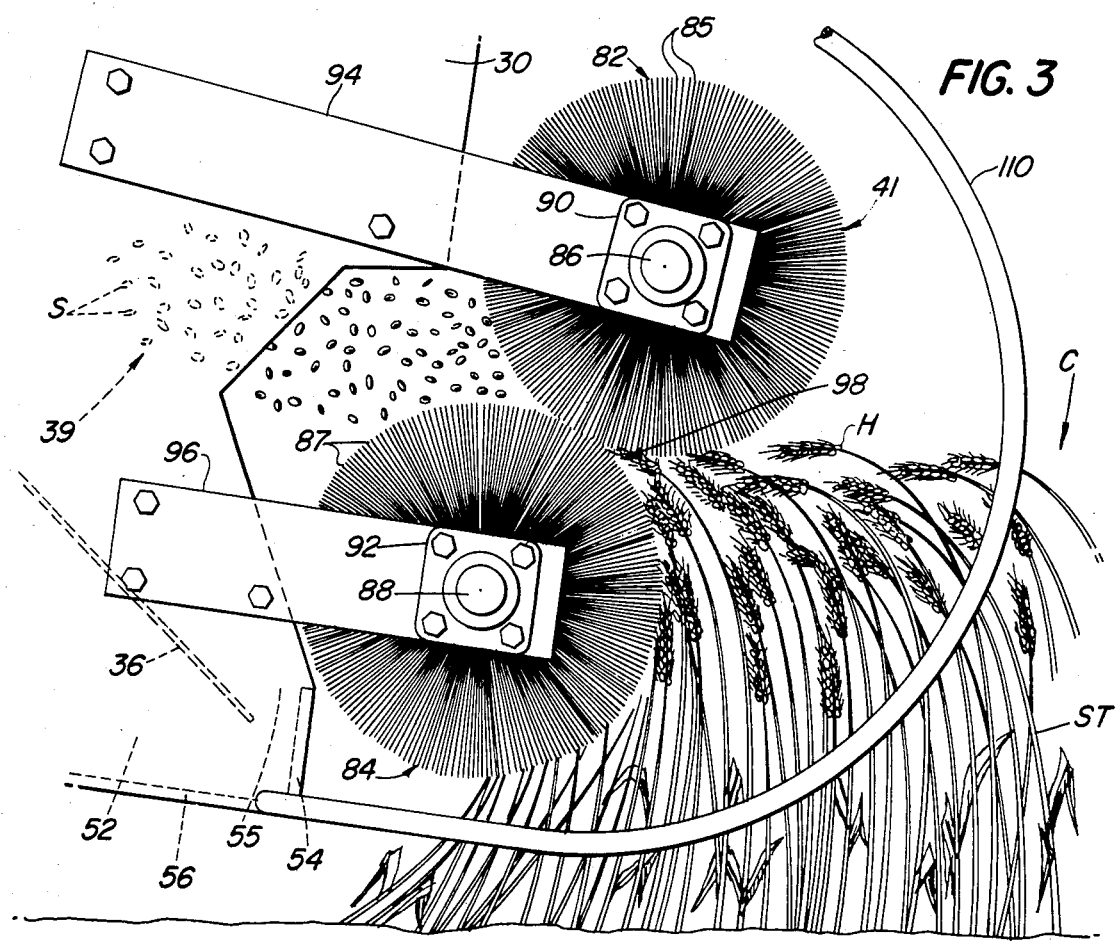
FIG. 3 is a fragmentary side view of a seed stripper mechanism of the harvester passing through a standing crop.

A harvester 10 according to the present invention comprises a self-propelled vehicle 12 to the front of which is mounted a vertically adjustable header 14 including a housing 16. The header 14 is connected to the vehicle by means of a suitable hitch 18. The hitch can be of conventional design, including one or more upper links 20, the front ends of which being pivotably connected to the rear ends of arms 22. The front ends of the arms 22 are pivotably connected to the housing 16. The hitch also includes a plurality of lower links 24 each pivotably connected to the vehicle 12 and to the housing 16. The upper and lower links 22, 24 are interconnected by float springs 26.

The header 14 is raised and lowered by hydraulic cylinders 28 which are pivotably connected between the vehicle 12 and the upper hitch links 20. The cylinders 28 are actuated by the vehicle hydraulic system.

The header housing 16 comprises a pair of side plates 30 joined at the rear by a transverse end plate (not shown) to which the arms 24 are connected. Mounted to the header housing 16 is a transport duct 32 for collecting and conducting away seeds which are separated from the crop stems. The duct 32 empties into a mobile collecting bin 33 towed behind the vehicle 12. The duct 32 includes top and bottom walls 34, 36 and sidewalls 38. The sidewalls 38 are mounted flush against the side plates 30 of the header housing 16. The mouth 39 or inlet end of the duct 32 extends between the plates 30 of the header immediately behind a crop stripping mechanism 41 carried at the front of the header as will be described in detail hereinafter.

Mounted on the rear of the header housing 16 is a first air blower 50 for generating a positive pressure air stream. The blower 50 can be of any suitable type and is enclosed by a housing 51 which defines an air outlet 48 arranged to impel air forwardly into a conduit 52 and thence into the mouth of the transport duct 32 creating a low pressure area behind the stripping mechanism 41. The conduit 52 is defined by the side plates 30 of the header, a top plate 53 extending from the conduit 32, an upright front plate 54, a bottom plate 56 extending between the side plates 30, and the bottom wall 36 of the transport duct 32. The front plate 54 forms an upright air deflector wall which reverses the air flow. The mouth of the duct 32 terminates short of the bottom plate 56 and the front plate or deflector wall 54 to define a gap 55 through which the air stream flows. As will be explained hereafter, the air stream receives and entrains harvested seeds from the stripper mechanism 41 and transports the seeds to the collecting bin 33.

Mounted on a framework 58 atop an upper end of the header housing 16 is a second air blower mechanism 60 which is arranged to generate an air stream which travels rearwardly in the general direction of the stripper mechanism. The blower 60 communicates with a conduit 62 that has a curved baffle 66 at its forward end to reverse the air flow. The baffle 66 is carried by a pivoted adjustment flange 67 which can be adjustably moved upon the conduit 62 to enable the inclination of the baffle plate 66 to be varied. As will be described hereinafter, the air stream from the conduit 62 is directed rearwardly and downwardly against a standing crop in front of the stripper mechanism to being the crop stems ST rearwardly in order to reorient the heads H of the crop C in a more advantageous posture for contact by the stripper mechanism. This air stream is concentrated in a direction toward the crop by means of a guide surface 69 extending from the baffle 66 to a hood 71 which surrounds an upper portion of the stripper mechanism.

The stripper mechanism 41 includes upper and lower rotors 82, 84 which are mounted for rotation about longitudinal axes disposed transversely of the direction of travel of the header. The rotors include crop contacting elements which strip seeds from the crop.

Preferably, the rotors are each in the form of a rotary brush which comprises a central hub from which project radial bristles 85, 87 formed of a stiff plastic such as polyurethane. The bristles are of a common radial length with the outer ends thereof randomly arranged and spaced on the brush periphery so that the brush presents a substantially solid face to the crop heads in longitudinal and circumferential directions of the brush (e.g., the bristle ends may be spaced one-half to one and one-half inches). Preferably, the bristles are of the type having an elliptical cross section and are crimped. The brushes can be any suitable diameter, but are preferably six to eight inches in diameter.

The brushes are mounted on horizontal shafts 86, 88 which are rotatably carried in bearings 90, 92 on opposite sides of the header 16. Upper bearings 90 for the upper brush 82 are carried at the forward ends of adjustable upper arms 94 and the lower bearings 92 for the lower brush 84 are carried by adjustable lower arms 96. By means of the arms 94, 96 the brushes 82, 84 can be independently raised and lowered to adapt the mechanism to crops of different height.

The brushes are preferably disposed closely together to form a bite or pinch point 98 between the brushes within which the crop heads are acted upon such that the seeds are pulled or rubbed from the stem. In this regard, the brushes 82, 84 are rotated in opposite directions, with the front side of the upper brush 82 moving downwardly and the front ends of the lower brush 84 moving upwardly. Thus, the bristles of both brushes travel rearwardly through the bite 98.

The brushes 82, 84 are oriented in a manner facilitating the entry of crop heads into the bite. More particularly, the lower side of the lower brush is disposed below the level of seeds on the standing crop, and the axis of the upper brush is above the level of the seeds on the crop. Moreover, the bristles 85 of the upper brush 82 extend forwardly of the lower bristles 87. Thus, the upper bristles make contact with taller crop heads in advance of the bite, which crop heads are in an inclined posture due to the air stream from the upper blower 60. Those crop heads are thus maintained in such inclined posture by the upper brush or are even further inclined thereby.

The air flow from the upper blower 60 is assisted by an air suction through the bite induced by the travel of air from the lower blower 50 and by the high-speed rotation of the brushes themselves.

Thus, the standing crop is acted upon by rearward air flow from the upper blower 60 on the one hand, and by suction developed by the air stream from the lower blower 50 and the brushes, on the other hand. The standing stems are thus bent rearwardly and are contacted by outer ends of the brush bristles in the bite, whereupon the seeds or kernels are stripped from the crop head.

In one preferred embodiment of the invention, the top blower 60 generates an air stream of about 2.17 m³/sec, which produces an air stream velocity of approximately 44 m/sec at the blower outlet and approximately 20 m/sec at the front of the brushes. The lower blower 50 generates an air stream of about 2.05 m³/sec which flows through the gap 55 at a velocity of approximately 30 m/sec.

The stripped seeds are propelled rearwardly by the brushes and become entrained within the discharge flow formed by a combination of the above-described air generating mechanisms.

The rear side of the lower brush 84 is situated such that the air stream from the lower blower 50 passes upwardly along the bristles thereof to impel toward the duct 32 any seeds which may have strayed from the discharge air flow.

Importantly, it has been found that the brushes should be driven such that the peripheral speed thereof, i.e., the linear speed of the bristle tips, is in the range of from 18 to 27 meters per second (m/sec), and most preferably from 21 to 23 m/sec, in order to achieve satisfactory stripping and collection of the seeds. That is, at higher speeds, the seeds tend to be thrown in random directions and an excessive amount of seed loss occurs. At lower speeds, the quantity of seeds left unstripped on the stem is excessive, and the crop stems may tend to wrap around the brush axles.

The brushes are respectively driven by a pair of individual motors 102 mounted to one side of the header 14 and preferably powered by the hydraulic system on the drive vehicle 12. In the preferred embodiment, the motors are connected in series, with the leakage from the top motor returned to the hydraulic system reservoir, so that the upper brush is driven at a slightly greater speed than the lower end and produces a rubbing or friction action on unthreshed heads in the bite between the rolls.

The header 16 is preferably provided with dividers 110 which separate the standing crop in advance of the stripper rolls.

In practice, the harvesting machine is advanced over a field of standing crop C such as wheat for example, although other crops as well may be subject to harvesting by the present invention.

As the crop heads H approach the bite 98, their stems ST are bent rearwardly under the action of (1) the rearwardly and downwardy directed air stream from the upper blower 60, (2) a rearward suction induced by the air stream from the lower blower 50 passing behind the brushes, and (3) the rearward air flow generated by the bristles themselves. The crop heads thus "point toward" the bite. Taller crop heads are initially acted upon by the upper brush and are guided into the bite 98. Within the bite the crop heads are engaged from opposite sides by the rapidly and rearwardly traveling bristle tips which strip the seeds S from the heads and simultaneously impel the seeds rearwardly into the discharge air stream and into the mouth of the transport duct 32.

Shorter crop heads will be acted upon by the front side of the lower brush and the seeds thereof will be stripped away and impelled through the bite, being deflected rearwardly by the upper brush, if necessary.

The stems of the crop will be essentially left attached to the ground and will pass beneath the header. That is, the randomly arranged tips of the brushes effectively present a "solid" face to the relatively wide crop heads but not to the very narrow stems. Thus, most of the stems can pass through or beneath the lower brush without being unearthed.

With the brush speed maintained at from 18 to 27 m/sec, and most preferably from 21 to 23 m/sec, it is assured that ample stripping of seeds occurs, that essentially all of the seeds will be directed toward the discharge air stream, and that the stems will not tend to wrap around the axle of the lower brush.

Seeds which may have strayed from or missed the discharge air flow and which are traveling downwardly behind or within the lower brush 84 are acted upon by the air stream from the lower blower 50 and are carried back into the discharge air flow.

The collected seeds are conducted by the duct 32 and are discharged into the mobile bin 33.

It will be appreciated that the present invention provides a novel and effective seed harvester which is smaller and less expensive than a traditional combine, mainly due to the reduced amount of chaff and straw which is carried in. By employing a stripper mechanism which essentially leaves the stems attached to the ground, smaller and less complicated material-handling equipment is required. Also, power requirements are significantly reduced. An important contribution of the present invention relates to the discovery of a range of rotor peripheral speeds which achieves successful stripping and yet leaves the crop stems attached to the ground. Also of particular significance is the positioning of upper and lower "solid" brushes relative to one another and relative to upper and lower streams of forced air, such that maximum stripping and recovery of seeds is achieved.

Although the invention has been described in connection with a preferred embodiment thereof, it will be appreciated by those skilled in the art, that additions, modifications, substitutions, and deletions not specifically described may be made without departing from the spirit and scope of the invention as defined in the appended claims.

I claim:

1. A harvesting machine for stripping seeds from a standing crop while essentially leaving the stems of the crop attached to the soil and comprising:

a mobile main frame adapted to advance over a field of the standing crop;

a vertically adjustable harvesting header carried by the main frame;

a first brush type axially transverse stripping rotor mounted for rotation on the header and having closely spaced radial bristles with outer ends forming a generally cylindrical outer periphery, the axis of the stripping rotor being below the level substantially all of the seeds on the standing crop;

a second brush type axially transverse stripping rotor having closely spaced radial bristles with outer ends forming a generally cylindrical outer periphery and mounted on the header forwardly and above the first stripping rotor in close proximity thereto, the axis of the second rotor being generally above the level of the seeds on the standing crop;

means for rotating the rotors in opposite directions at peripheral speeds in the range of 18 to 27 m/sec, the front side of the first rotor moving upwardly and the front side of the second rotor moving downwardly so that the seeds engaged by the rotors move rearwardly through the bite between the rotors and are stripped from the standing stems;

a crop collector on the header behind the rotors for receiving material passing through the bite between the rotors and having an outlet; and a blower means mounted on the header and having an outlet communicating with the housing adjacent to the first rotor for directing a stream of air along the rear side of the first rotor and through the outlet, the air stream inducing a rearward flow of air between the rotors to convey stripped seeds rearwardly.

2. The invention defined in claim 1, and including a second blower means mounted on the header and having a rearwardly directed outlet forwardly of the second rotor and above the level of the standing crop for directing a rearward stream of air toward the bite between the rotors.

3. The invention defined in claim 1, wherein the outer ends of the bristles are randomly located on the brush periphery so that the rotating brush presents a substantially solid face to the crop, the seeds being stripped from the stems by the outer ends of the bristles.

4. The invention defined in claim 1, wherein the rotating means comprises means for rotating the rotors in the range of from 21 to 23 m/sec.

5. A harvesting machine for stripping seeds from a standing crop while essentially leaving the stems of the crop attached to the soil and comprising:
   a mobile frame adapted to advance over a field of the standing crop;
   a harvesting header carried by the main frame;
   a lower axially transverse stripping brush mounted for rotation on the header and having a hub and radially projecting resilient bristles, the bristles being of a common radial length, with the outer ends thereof being randomly oriented on the brush periphery so that the rotating lower brush presents a substantially solid face to the crop, the lower side of the lower brush being below the level of the seeds on the standing crop;
   an upper axially transverse stripping brush mounted on the header forwardly of and above the lower stripping brush in close proximity thereto, the upper brush including a hub and radially projecting resilient bristles which have a common radial length with the outer ends thereof being randomly oriented on the brush periphery so that the rotating upper brush presents a substantially solid face to the crop, the axis of the upper brush being generally above the level of the seeds on the standing crop;
   means for rotating the brushes in opposite directions at peripheral speeds in the range of 18 to 27 meters per second, the front side of the lower brush moving upwardly and the front side of the upper brush moving downwardly so that the seeds engaged by the bristles of the brushes move rearwardly through the bite between the rotors and are stripped from the standing stems;
   a crop collector on the header behind the rotors for receiving material passing through the bite between the rotors and having an outlet; and
   a blower means mounted on the header and having an outlet directed rearwardly toward the brushes for directing a stream of air against the standing crop ahead of the brushes to bend the stems toward the bite and a guide plate between the upper brush and the outlet for directing air into the bite between the brushes.

6. The invention defined in claim 5, and including a second blower means mounted on the header and having an outlet communicating with the housing adjacent to the first brush for directing a stream of air along the rear side of the first brush through the outlet, the air stream including a rearward flow of air through the brushes.

* * * * *